(12) United States Patent
Penzo et al.

(10) Patent No.: US 11,636,104 B2
(45) Date of Patent: Apr. 25, 2023

(54) ANALYTICS CENTER HAVING A NATURAL LANGUAGE QUERY (NLQ) INTERFACE

(71) Applicant: ServiceNow, Inc., Santa Clara, CA (US)

(72) Inventors: Marta Penzo, Amsterdam (NL); Aida Rikovic Tabak, Amsterdam (NL); Dimosthenis Mouzouris, Amsterdam (NL); Size Ma, Amsterdam (NL); Olga Redkina, Amsterdam (NL)

(73) Assignee: ServiceNow, Inc., Santa Clara, CA (US)

( * ) Notice: Subject to any disclaimer, the term of this patent is extended or adjusted under 35 U.S.C. 154(b) by 254 days.

(21) Appl. No.: 16/941,256

(22) Filed: Jul. 28, 2020

(65) Prior Publication Data

US 2022/0035802 A1    Feb. 3, 2022

(51) Int. Cl.

| | |
|---|---|
| *G06F 3/048* | (2013.01) |
| *G06F 16/245* | (2019.01) |
| *G06F 16/242* | (2019.01) |
| *G06F 40/279* | (2020.01) |
| *G06F 3/0482* | (2013.01) |

(52) U.S. Cl.
CPC .......... *G06F 16/245* (2019.01); *G06F 3/0482* (2013.01); *G06F 16/243* (2019.01); *G06F 40/279* (2020.01)

(58) Field of Classification Search
CPC ................. G06F 16/3329; G06F 3/167; G06F 16/24522; G06F 16/90332; G06F 3/0481; G06F 16/245; G06F 3/0482; G06F 16/243; G06F 16/3344; G06Q 10/10; G10L 15/22; G10L 15/1822
See application file for complete search history.

(56) References Cited

U.S. PATENT DOCUMENTS

| | | | |
|---|---|---|---|
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |

(Continued)

*Primary Examiner* — Steven B Theriault
(74) *Attorney, Agent, or Firm* — Fletcher Yoder PC

(57) ABSTRACT

An analytics server is disclosed that enables natural language queries (NLQs) to be used to access key performance indicator (KPI) data. The analytics server includes a graphical user interface (GUI) that presents a set of KPIs associated with a user. The GUI includes suitable user interface elements to enable the user to provide natural language queries regarding these KPIs. The user interface elements provide the user with suggested NLQs based on, for example, KPIs to which the user has access and/or previous NLQs of the user. In response to the analytics server receiving a suitable NLQ from the user, the analytics server generates an appropriate database query to retrieve the KPI data requested by the NLQ. The GUI is then updated to present a visual representation (e.g., a bar graph, a pie chart, a trend line, a single value) of the retrieved KPI data.

20 Claims, 11 Drawing Sheets

(56) References Cited

U.S. PATENT DOCUMENTS

| | | |
|---|---|---|
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidar |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 3,051,164 A1 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 10,002,203 B2 | 6/2018 | George |
| 10,546,001 B1* | 1/2020 | Nguyen ............... G06F 40/186 |
| 10,628,603 B1* | 4/2020 | de Boer ............... H04L 63/105 |
| 10,628,771 B1* | 4/2020 | Sicilia .............. G06Q 10/06393 |
| 10,826,776 B2* | 11/2020 | Singh ..................... H04L 43/16 |
| 11,048,677 B1* | 6/2021 | Chandrashekar ....... H04L 43/04 |
| 11,347,695 B2* | 5/2022 | Xu ....................... G06F 16/178 |
| 11,347,803 B2* | 5/2022 | Prabhugaonkar ..... G06F 40/284 |
| 2015/0195345 A1* | 7/2015 | Burrows .......... G06Q 10/06393 |
| | | 715/739 |
| 2016/0371317 A1* | 12/2016 | Sharma ................ G06Q 10/067 |
| 2016/0371623 A1* | 12/2016 | Sharma ............ G06Q 10/06393 |
| 2017/0024674 A1* | 1/2017 | Lerena ............ G06Q 10/06313 |
| 2017/0277626 A1* | 9/2017 | Murthy ............... G06F 11/3692 |
| 2018/0005161 A1* | 1/2018 | Cong ............... G06Q 10/06398 |
| 2018/0144064 A1* | 5/2018 | Krasadakis ....... G06F 16/90332 |
| 2019/0147055 A1* | 5/2019 | Erpenbach ............. G16H 15/00 |
| | | 707/608 |
| 2020/0019822 A1* | 1/2020 | Kothandaraman ..... G06F 11/34 |
| 2020/0104401 A1* | 4/2020 | Burnett ................. G06F 16/287 |
| 2020/0104402 A1* | 4/2020 | Burnett ............... G06F 16/2477 |
| 2020/0104775 A1* | 4/2020 | Chintalapati ......... G06T 11/206 |
| 2020/0151746 A1* | 5/2020 | Wu ..................... G06Q 30/0204 |
| 2020/0210647 A1* | 7/2020 | Panuganty ............. G06N 20/10 |
| 2020/0251111 A1* | 8/2020 | Temkin .................. G10L 15/22 |
| 2021/0089860 A1* | 3/2021 | Heere ................... G06N 20/00 |
| 2021/0350224 A1* | 11/2021 | Walters ........... G06Q 10/06395 |
| 2022/0035802 A1* | 2/2022 | Penzo ................. G06F 16/3344 |

* cited by examiner

| ☐ | ACTIVE | ACTIVITY... | ADDITIONAL ASSIGNEE LIST | APPROVAL | APPROV... | APPROV... | ASSIGNED TO | ASSIGNMENT GROUP | BUSINESS DURATION | SERV |
|---|---|---|---|---|---|---|---|---|---|---|
| ☐☐ | TRUE | UNKNOWN | | NOT YET REQUESTED :: | | | (EMPTY) | (EMPTY) | | (EM |
| | TRUE | UNKNOWN | | NOT YET REQUESTED | | | (EMPTY) | (EMPTY) | | (EM |
| | TRUE | UNKNOWN | | NOT YET REQUESTED | | | BESS MARSO | TECHNICAL SERVICES SUPPORT | 23 HOURS 15 MINUTES | SALE |
| | TRUE | UNKNOWN | | NOT YET REQUESTED | | | BRYANT BOULIOURIS | SALES SYSTEMS SUPPORT | 2 DAYS | INSI |
| | TRUE | UNKNOWN | | NOT YET REQUESTED | | | BART HACHEY | FINANCIAL SYSTEMS SUPPORT | 1 DAY 5 HOURS 25 MINUTES | FIDE |
| | TRUE | UNKNOWN | | NOT YET REQUESTED | | | ATHENA FONTANILLA | FINANCIAL SYSTEMS SUPPORT | 16 HOURS | FIE |
| | TRUE | UNKNOWN | | NOT YET REQUESTED | | | BETH ANGLIN | SAP SUPPORT | 2 DAYS 8 HOURS | SAP |
| | TRUE | UNKNOWN | | NOT YET REQUESTED | | | ALVA PENNINGTON | HR SYSTEMS SUPPORT | 1 DAY 16 HOURS | LINK |
| | TRUE | UNKNOWN | | NOT YET REQUESTED | | | BENJAMIN SCHKADE | FINANCIAL SYSTEMS SUPPORT | 2 DAYS | DNB |
| | TRUE | UNKNOWN | | NOT YET REQUESTED | | | BYRON FORTUNA | SALES SYSTEMS SUPPORT | 2 DAYS 8 HOURS | ANA |
| | TRUE | UNKNOWN | | NOT YET REQUESTED | | | BETTE BARCELONA | TECHNICAL SERVICES SUPPORT | 2 DAYS | TAB |
| | TRUE | UNKNOWN | | NOT YET REQUESTED | | | BURTON BRINING | SALES SYSTEMS SUPPORT | 1 DAY 16 HOURS | SAB |
| | TRUE | UNKNOWN | | NOT YET REQUESTED | | | LACY BELMONT | MARKETING OPERATIONS | 1 DAY 16 HOURS | ADO |
| | TRUE | UNKNOWN | | NOT YET REQUESTED | | | AMOS LINNAN | SAP SUPPORT | 2 DAYS 8 HOURS | SAP |

FIG. 11

ANALYTICS CENTER HAVING A NATURAL LANGUAGE QUERY (NLQ) INTERFACE

BACKGROUND

The present disclosure relates generally to key performance indicators (KPIs), and, more specifically, to enabling improved navigation and analysis of KPIs using natural language queries (NLQs).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

Certain cloud computing platforms host a configuration management database (CMDB) to manage configuration items (CIs) associated with a client network. During operation, the CMDB accumulates data regarding a number of operational metrics, such as a number of CIs within the CMDB or a number of incidents (INTs) opened within particular timeframes. Additionally, certain cloud-based platforms may accumulate data regarding business-related metrics of the client enterprise, such as costs, salaries, sales, customers, and so forth. Certain metrics may be defined as key performance indicators (KPIs) of a client, which may be tracked within the cloud-based system for later analysis. Additionally, certain users may be tasked with reviewing particular KPIs on a regular basis. For example, a particular user may review current or historical values of a particular KPI, such as a number of INTs opened within the last 30 days, and then use this KPI data to determine whether there are underlying issues to be addressed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed toward an analytics server that enables natural language queries (NLQs) to be used to view and analyze key performance indicator (KPI) data. The analytics server includes a graphical user interface (GUI) that presents a set of KPIs that are associated with a user. The GUI includes suitable user interface elements to enable the user to provide NLQs regarding these KPIs. The user interface elements provide the user with suggestions based on, for example, KPIs to which the user has access and/or previously received NLQs. In response to the analytics server receiving a suitable NLQ from the user, the analytics server provides the natural language query to a natural language processor (NLP) for analysis. Based on the results of this analysis, the analytics server generates an appropriate database query to retrieve the KPI data requested by the NLQ. The GUI is then updated to present a visual representation (e.g., a bar graph, a pie chart, a trend line, a single value) of the retrieved KPI data. Additionally, the user interface elements continue to be presented on the GUI, alongside the visual representation, to enable the user to continue to adjust the natural language query or to provide new natural language queries to further adjust the scope of the KPI data retrieved and presented. This enables the user to efficiently "drill down" into particular KPI data using NLQs, without requiring the user to be familiar with complex database query languages.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIGS. 6, 7, 8, 9, 10, and 11 are simulated screenshots of portions of an embodiment of a graphical user interface (GUI) of the analytics server, in accordance with aspects of the present disclosure.

DETAILED DESCRIPTION

Figure 1:
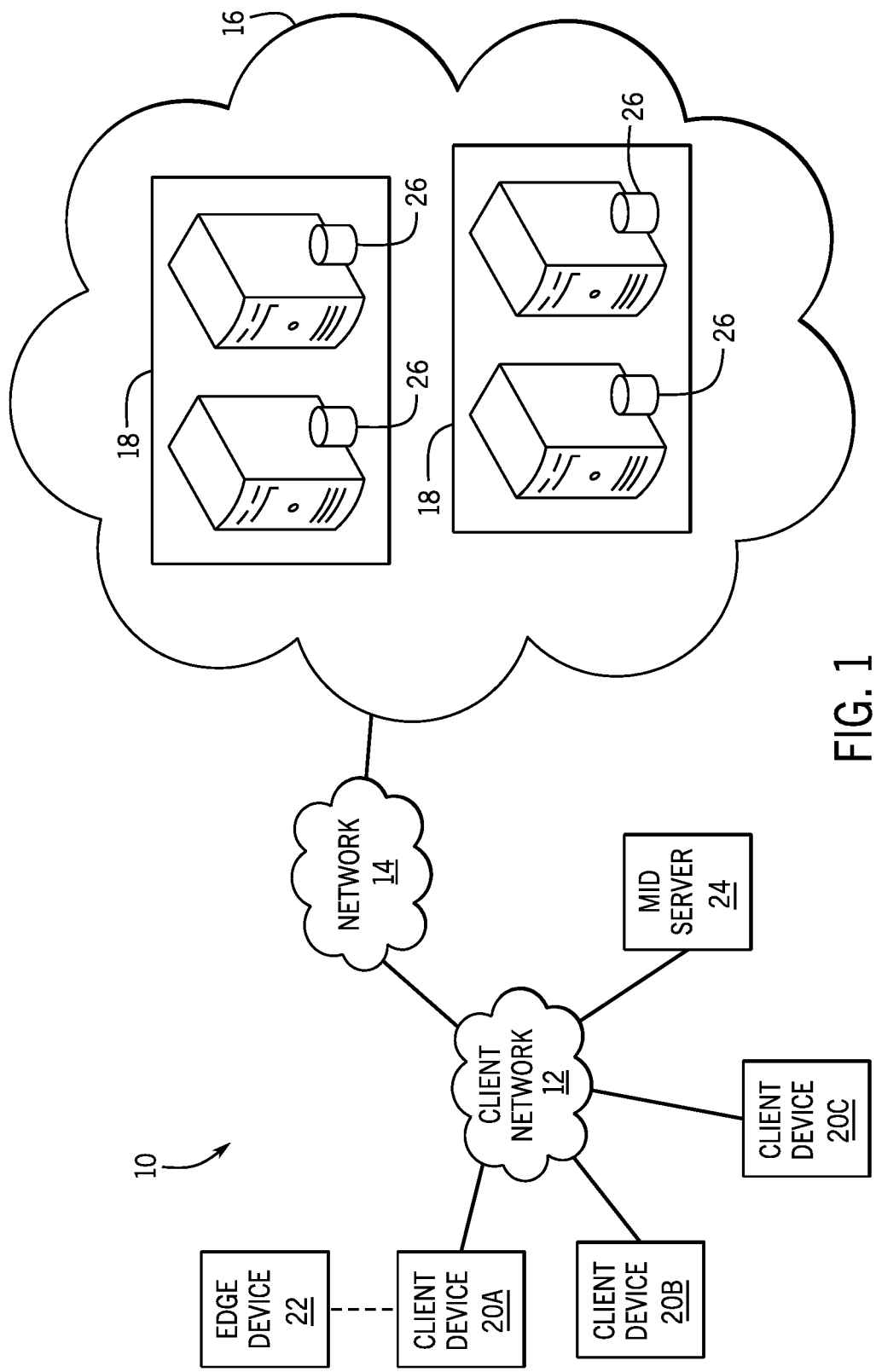
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a CMDB. As used herein, the terms alerts, incidents (INTs), changes (CHGs), and problems (PRBs) are used in accordance with the generally accepted use of the terminology for CMDBs. Moreover, the term "issues" with respect to a CI of a CMDB collectively refers to alerts, INTs, CHGs, and PRBs associated with the CI.

As mentioned, a cloud-based platform may host a CMDB or another system that accumulates data regarding operational and/or business metrics to support a client enterprise. Certain of these metrics may be stored as key performance indicators (KPIs) within a database, such as a CMDB, and the metric data may be collected for these KPIs over time for later analysis. Certain users may be tasked with monitoring particular KPIs and may desire to view the collected KPI data in particular visual formats (e.g., bar graphs, trend lines, pie charts) that may be different than the preferences of other users. Additionally, certain users may not be authorized to access particular KPI data. Moreover, certain users may not be qualified or trained to create customized queries in a database query language, such as standard query language (SQL), and are, nevertheless, tasked with analyzing KPI data. As such, prior to the present disclosure, a user desiring a particular subset or visual representation of KPI data would have to request the creation of a custom database query by a suitable developer, introducing substantial cost and delay into the process.

With this in mind, present embodiments are directed toward an analytics server that enables natural language queries (NLQs) to be used to access and analyze KPI data. The analytics server includes a graphical user interface (GUI) that presents a set of KPIs that may be associated with a user (i.e., are user-based or user-specific). The GUI includes suitable user interface elements to enable the user to provide NLQs regarding these KPIs. The NLQ user interface elements may provide the user with suggested NLQs based on KPIs to which the user has access and/or previous NLQs of the user or other users preforming similar or related functions. In response to the analytics server receiving a suitable NLQ from the user, the analytics server provides the query to a natural language processor (NLP) for analysis. Based on the query details extracted from the NLQ by the NLP, the analytics server generates an appropriate database query to retrieve the KPI data requested by the natural language query. The GUI is then updated to present a visual representation (e.g., a bar graph, a pie chart, a trend line, a single value) of the retrieved KPI data. Furthermore, the NLQ user interface elements continue to be presented on the GUI to enable the user to continue to adjust the NLQ or to provide new NLQs to further adjust the scope of the KPI data retrieved and presented. This enables the user to effectively and efficiently "drill down" into particular KPI data using NLQs, without requiring the user to be familiar with complex database query languages.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
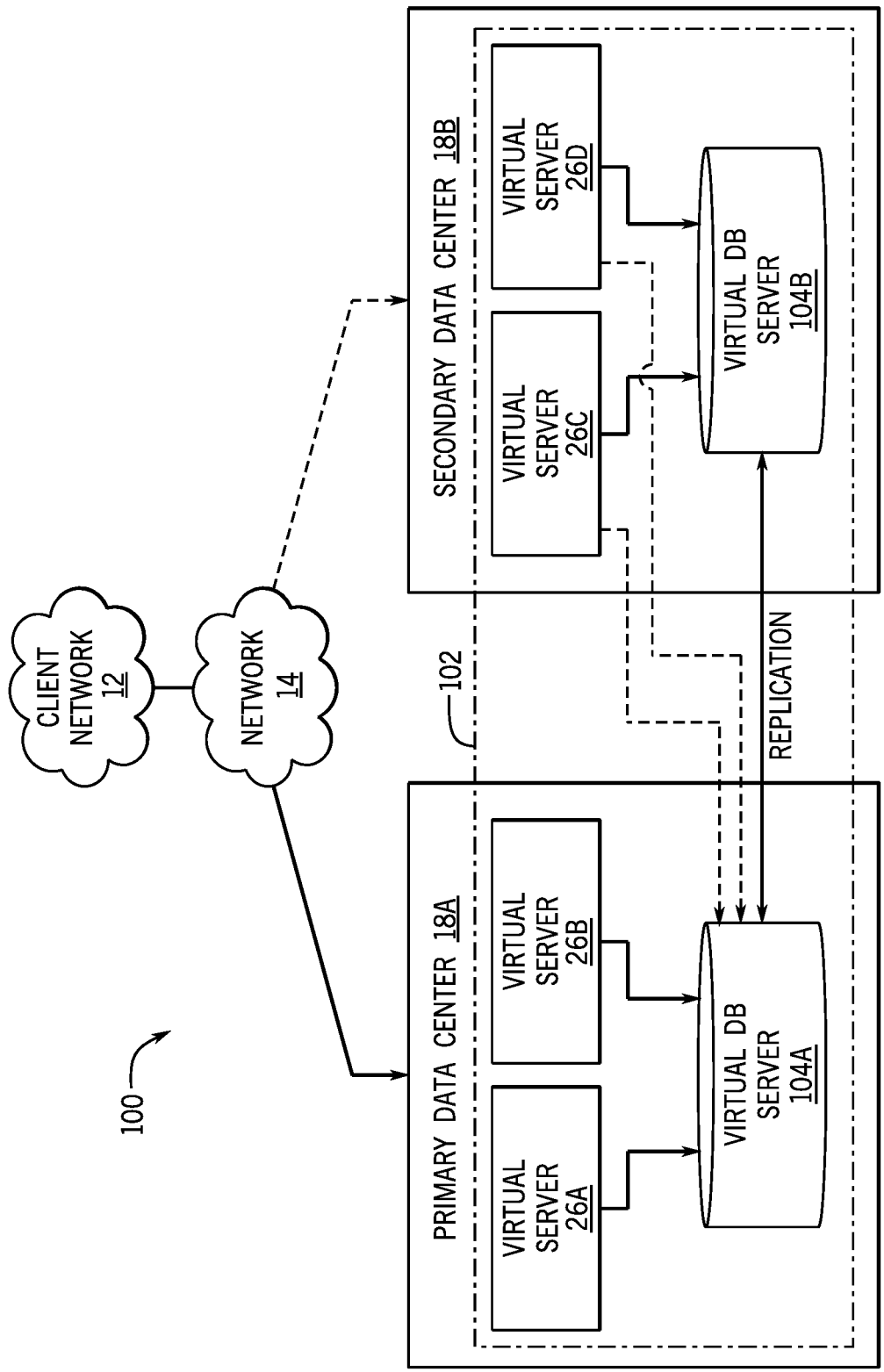
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
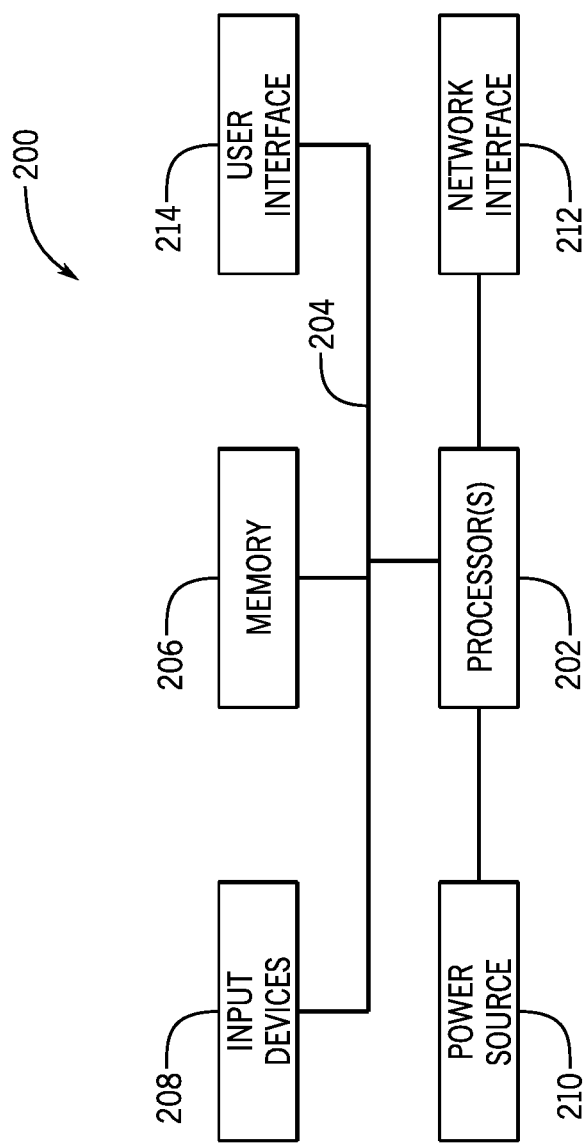
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
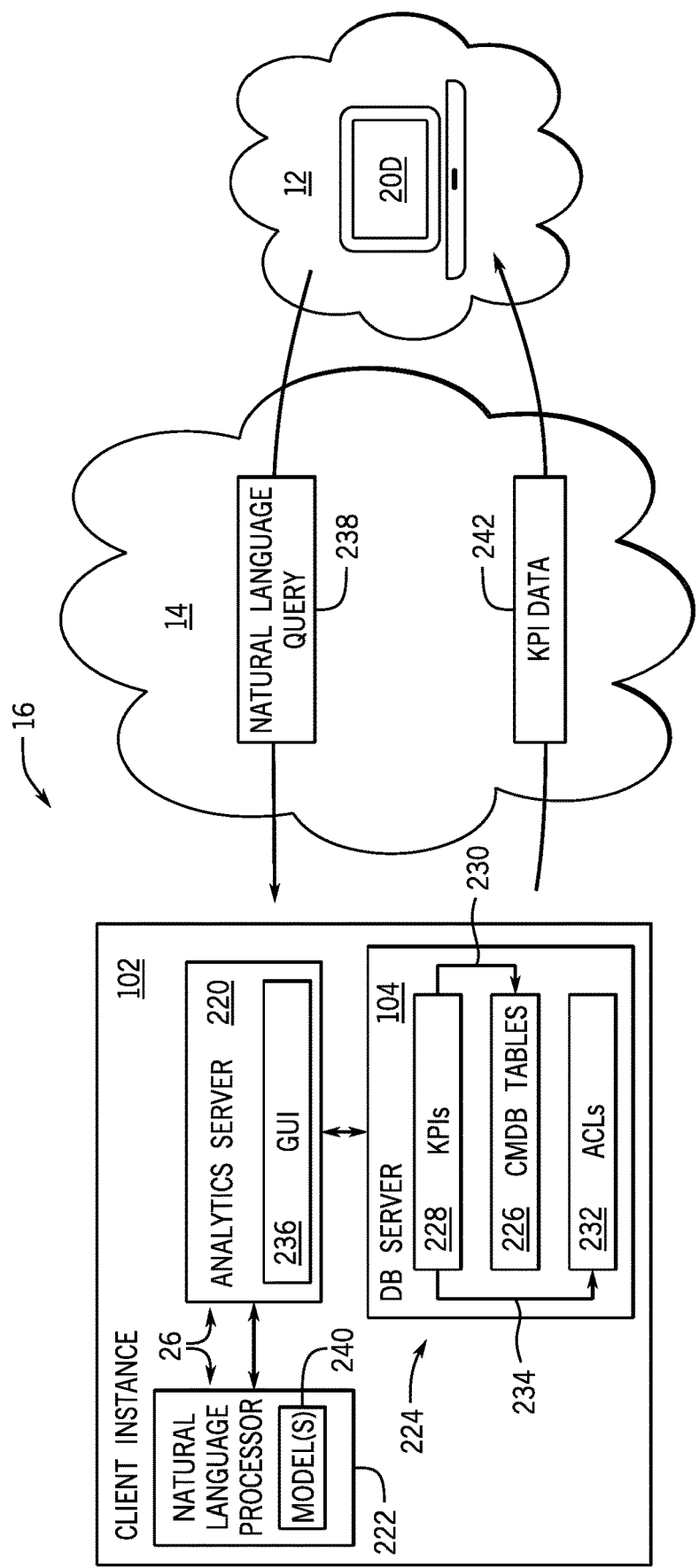
FIG. 4 is a block diagram illustrating an embodiment in which a client instance includes a configuration management database (CMDB) and an analytics server, in accordance with aspects of the present disclosure.

With the preceding in mind, FIG. 4 is a block diagram illustrating an embodiment in which one or more virtual servers 26 support and enable the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

More specifically, for the illustrated embodiment, the client instance 102 includes an analytics server 220 and a natural language processor (NLP) 222, each hosted by a virtual server 26. In other embodiments, the NLP 222 may be hosted by a separate instance (e.g., an enterprise, administrative, or shared instance) that is communicatively coupled to the analytics server 220 of the client instance 102 for reduced overhead and enhanced efficiency. The client instance 102 also includes a database server 104 that is designed to stored data related to a client enterprise. For the illustrated embodiment, the client instance 102 includes or hosts a CMDB 224 that stores and manages CI data for a number of CIs that are associated with the client network 12. As such, the DB server 104 includes or hosts a number of CMDB tables 226, which may include, for example, CI tables, INT tables, PRB tables, CHG tables, and so forth, storing various data related to the CIs that are managed by the CMDB 224.

The illustrated DB server 104 also includes a key performance indicators (KPIs) table 228 that is designed to store metric data (e.g., historical or trend data) for KPIs that are associated with a client enterprise. For the illustrated embodiment, the KPIs stored in the KPIs table 228 may include KPIs that are related to the CMDB and the CIs managed thereby. For example, the KPIs table 228 may include an incidents KPI that tracks the number of INTs that are present in the CMDB over time, or a KPI that tracks the number of CIs managed by the CMDB over time. As such, certain KPIs include or are associated with one or more database queries that are periodically executed (e.g., hourly, nightly, weekly) to determine a current value for the KPI, and the results of each query execution may be stored as KPI data within the KPIs table 228 for later trend analysis. As such, for the illustrated embodiment, the KPI data stored in the KPIs table 228 may be updated based on data present within the CMDB tables 226 at various points in time, as indicated by the arrow 230. In certain embodiments, the KPIs stored and tracked within the KPIs table 228 may be limited to CMDB data describing the operation of CIs of the managed client network 12. In other embodiments, the KPIs stored and tracked within the KPIs table 228 may include business-related metrics, such as salaries, sales, costs, number and classification employees, or any other metrics that may be useful for analysis of business aspects of the client enterprise. As such, it may be appreciated that the KPI data stored by the KPIs table 228 may be collected by suitably querying any suitable client or CMDB data stored by the DB server 104.

The illustrated DB server 104 also includes an access control lists (ACLs) table 232 that is designed to store information regarding various user and roles, and corresponding data to which these users and roles have access within the DB server 104 or CMDB 224. For the illustrated embodiment, access to KPIs stored in the KPIs table 228 is managed based on related entries in the ACLs table 232, as indicated by the arrow 234. As such, using ACLs table 232, the analytics server 220 ensures that users are only able to access and provide NLQ for KPI data that is appropriate for their respective roles. For example, a human-resource-related KPI stored in the KPIs table 228 may only be accessible to a user that is assigned to a human-resource role within the ACLs table 232.

For example, as illustrated, a user of the client device 20 may access a graphical user interface (GUI) 236 provided or hosted by the analytics server 220 to view KPI data and to provide a natural language query (NLQ) 238 for KPI data to the analytics server 220 of the client instance 102 for processing. As discussed below, the analytics server 220 provides the received NLQ 238 to the NLP 222 for analysis. The NLP 222 may use one or more suitable models 240 (e.g., a language model, an intent/entity model) that are populated or trained based on the names and datatypes of the tables, datasets, queries, and fields stored by the DB server 104 or CMDB 224. Using these models 240, the NLP 222 processes the NLQ 238 and identifies query details specified in the NLQ 238, and provides this information to the analytics server 220. The analytics server 220 generates a database query, based on the query details extracted from the NLQ 238, and stores the NLQ 238 along with the generated database query in the KPIs table 228, such that it is associated with the user that submitted the NLQ 238. Additionally, presuming the user is authorized in the ACLs table 232 to access the requested KPI data, the analytics server 220 executes the database query and responds to the NLQ 238 by providing, to the client device 20, the KPI data 242 that is returned by the database query. For example, the analytics server 220 may update or refresh the GUI 236 provided to the client device 20 to present the retrieved KPI data 242 to the user of the client device 20 in a desired visual format.

Figure 5:
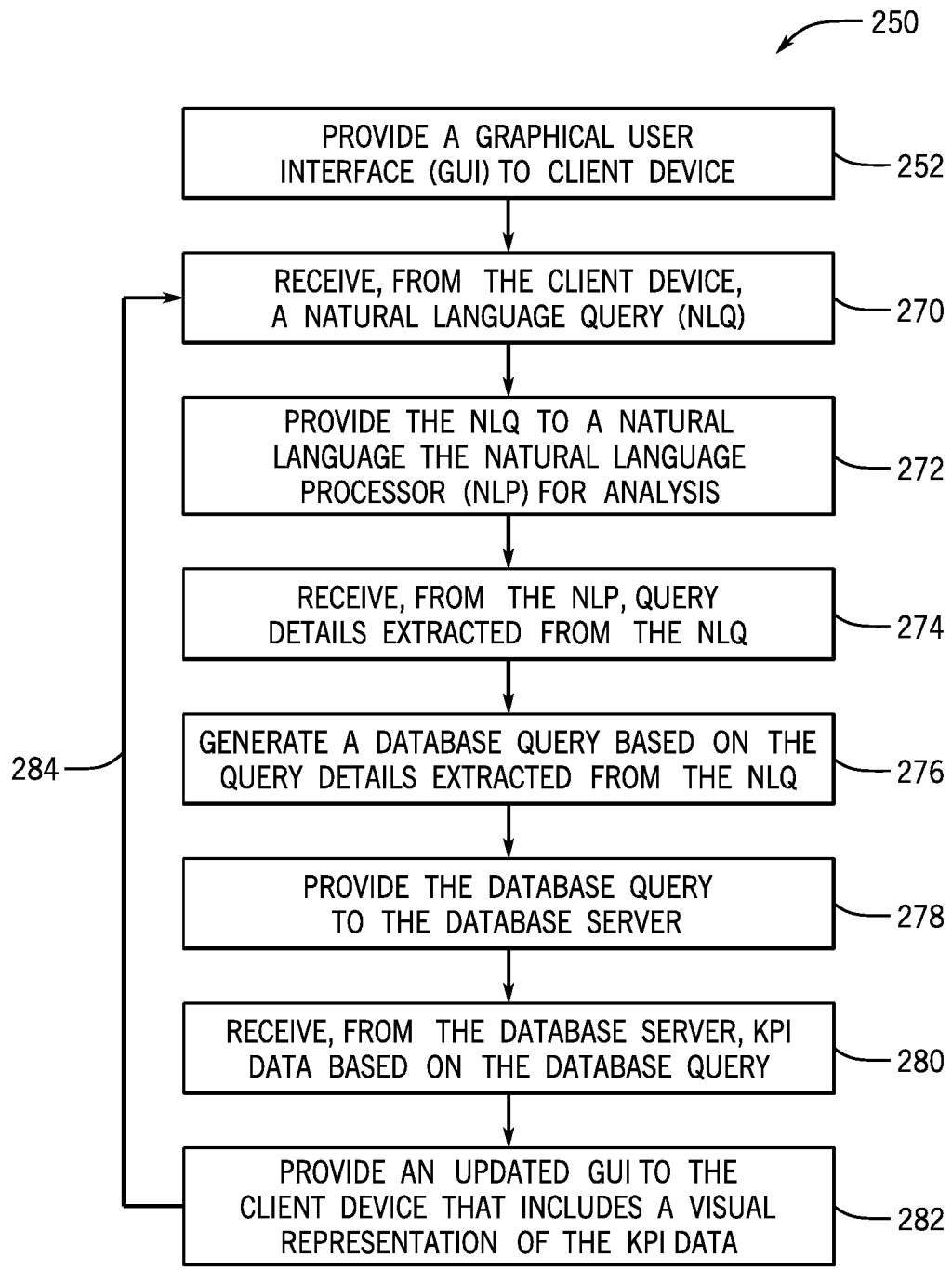
FIG. 5 is a flow diagram illustrating an embodiment of a process whereby the analytics server receives and processes natural language queries (NLQs) to retrieve key performance indicator (KPI) data, in accordance with aspects of the present disclosure.

FIG. 5 is a flow diagram illustrating an embodiment of a process 250 whereby the analytics server 220 receives and processes at least one NLQ 238 to retrieve and present KPI data 242. In certain embodiments, the process 250 may be stored as instructions in a suitable memory (e.g., memory 206) and executed by a suitable processor (e.g., processor(s) 202) associated with the analytics server 220 and the client instance 102. The process 250 is merely illustrated as an example, and in other embodiments, the process 250 may include additional steps, omitted steps, repeated steps, and so forth, in accordance with the present disclosure. Additionally, the process 250 of FIG. 5 is discussed with reference to elements illustrated in FIG. 4, as well as to elements of FIGS. 6-11, which are simulated screenshots of portions of an embodiment of the GUI 236 of the analytics server 220. While particular user interface elements and layouts are illustrated in FIGS. 6-11, it may be appreciated that these are merely illustrative, and in other embodiments, the GUI 236 may include other suitable user interface elements and layouts, in accordance with the present disclosure.

Figure 6:
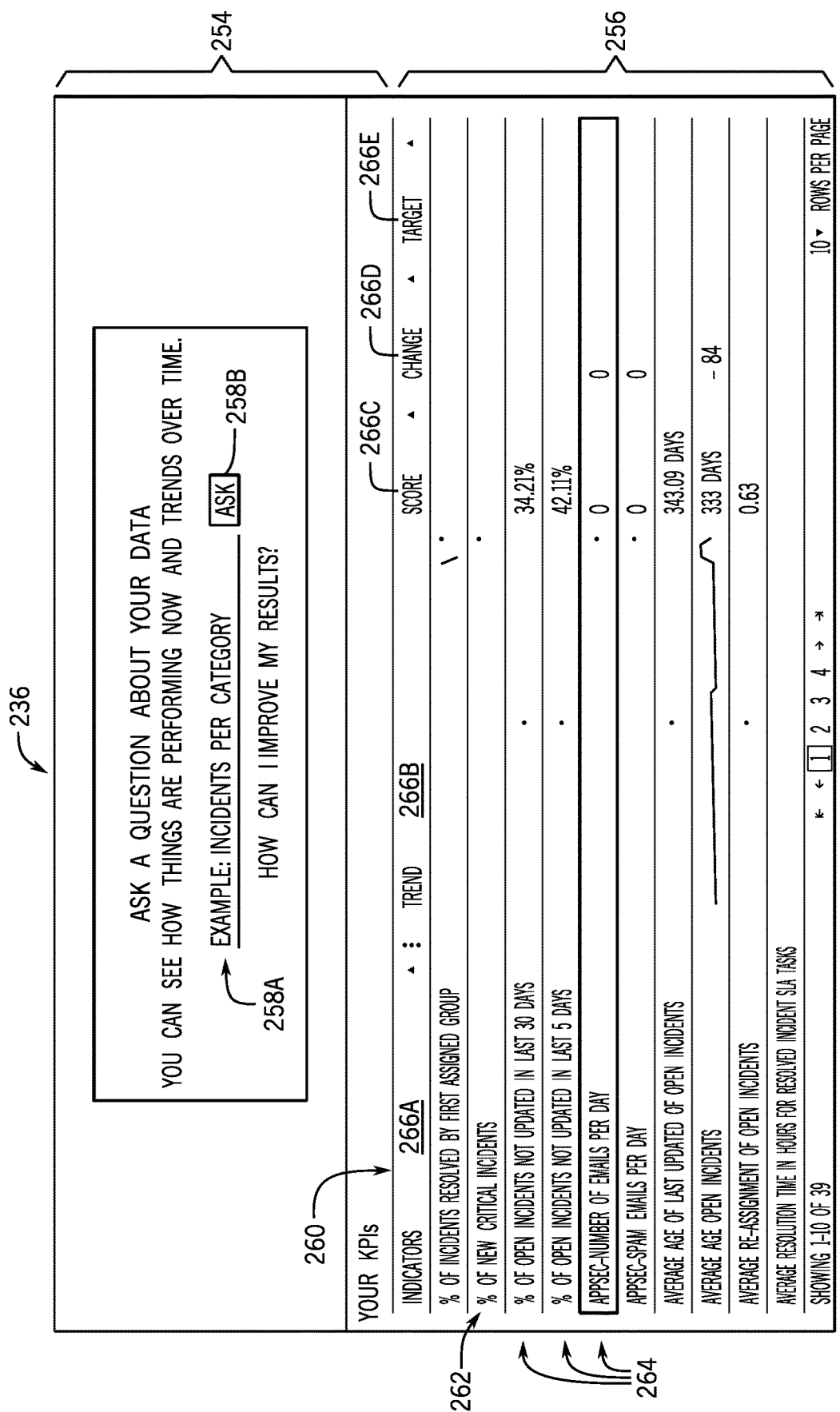
Figure 7:
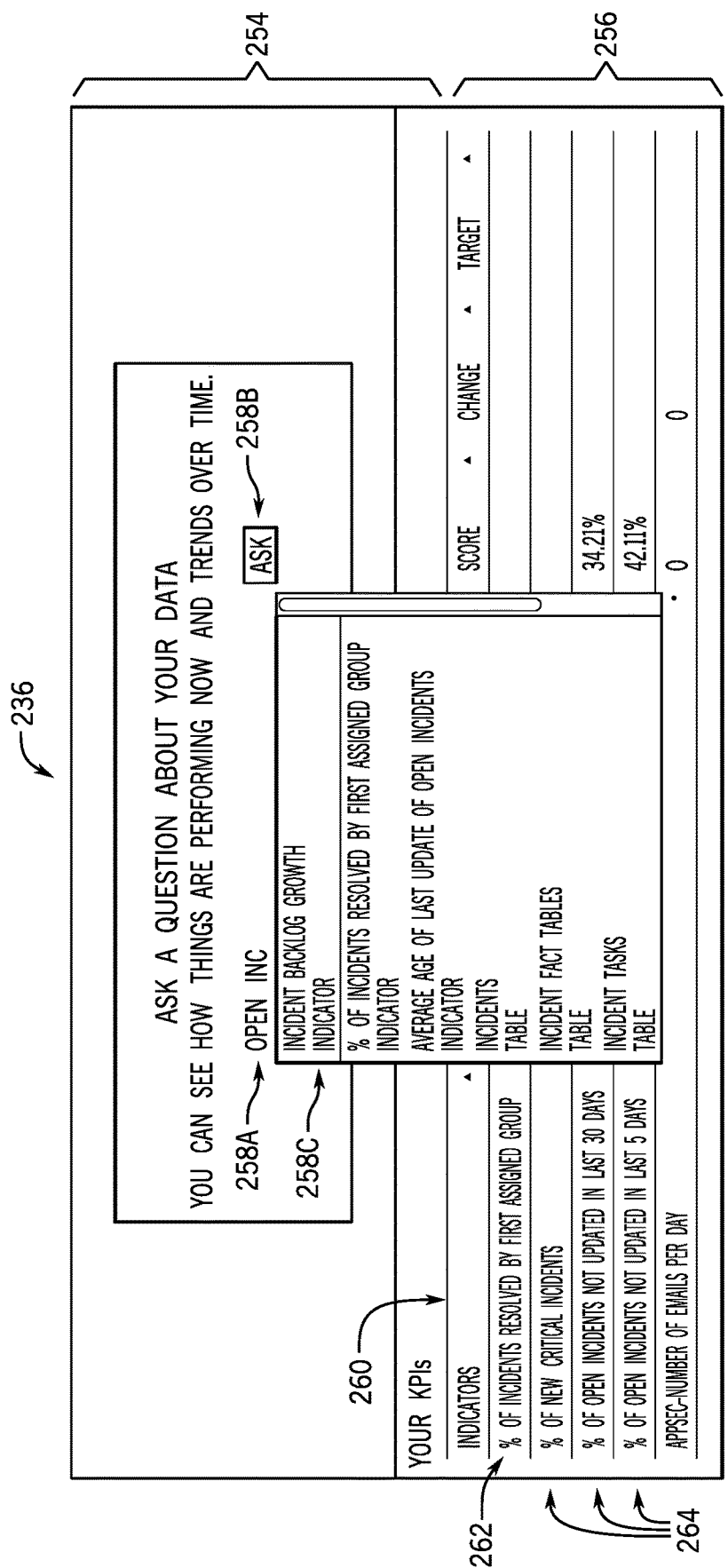

The illustrated process 250 begins with the analytics server 220 providing (block 252) the GUI 236 to the client device 20. For example, as set forth above, the client device 20 may execute a web-browser or another suitable application that presents or displays the GUI 236 provided by the analytics server 220 to a user. FIG. 6 illustrates a portion of an embodiment of the GUI 236 that may be initially presented to a user by the analytics server 220, which includes a NLQ section 254 and a KPIs section 256. The NLQ 238 section includes user interface elements 258, such as the text-entry box 258A and button 258B, which are designed to receive the NLQ 238 from the user. As illustrated in FIG. 7, in certain embodiments, to facilitate preparation of the NLQ 238, the user interface elements 258 of the GUI 236 may be designed to present a list (e.g., drop down list 258C) including selectable suggested NLQs as the user is preparing the NLQ 238. The suggested NLQs may be based on KPIs to which the user has access according to their role in the CMDB 224, previous NLQs provided by the user and stored within the CMDB 224, or previous NLQs provided by other users of the same role and stored within the CMDB 224. For example, in certain embodiments, before or while providing the GUI 236 to the client device 20, the analytics server 220 may retrieve NLQs from text fields of the KPIs table 228 (e.g., a KPI name field, a KPI description field, a NLQ field) for KPIs that are associated with the particular user or role within the ACLs table 232. In certain embodiments, the analytics server 220 may store NLQs submitted by the user in a different table of the database server 104 and may retrieve these previously submitted NLQs before or while providing the GUI 236 to the client device 20. As illustrated in FIG. 7, as the user types the NLQ 238 into the text-entry box 258A, the GUI 236 or the analytics server 220 performs pattern matching of the entered text relative to the retrieved KPIs and NLQs, and may present the patterned-matched, selectable NLQs suggestions within the list 258C of suggested NLQs.

The KPIs section 256 of the GUI 236 illustrated in FIGS. 6 and 7 includes a table 260 that presents a KPIs list 262 associated with the user. For example, the KPIs list 262 may include KPIs stored in the KPIs table 228 that are associated with the particular user or role within the ACLs table 232. In certain embodiments, the KPIs list 262 may include KPIs that where created based on previously received NLQs. For the illustrated embodiment, each of the rows 264 of the table 260 corresponds to a KPI that is associated with the user, and each of the columns 266 of the table 260 presents data related to each of these KPIs. For the illustrated embodiment, the column 266A presents a name or description of the KPI, and column 266B presents a visual depiction of a current trend line of the KPI data associated with the KPI over a predefined time window (e.g., over the previous day, week, month, year, etc.). For certain rows 264, column 266C presents a current data point value of the KPI data associated with the KPI, column 266D presents a change between the current value of the KPI data and the previous data point value of the KPI data associated with the query, and column 266E presents a target value associated with the underlying KPI. In certain embodiments, GUI 236 may respond to a user selection of a KPI from the KPI list 262 by presenting a visual representation of the KPI data associated with the selected KPI, as illustrated and discussed with respect to FIGS. 8-10.

Returning to FIG. 5, the process 250 continues with the analytics server 220 receiving (block 270) the NLQ 238 from the client device 20. As mentioned, the user may interact with the user interface elements 258 (e.g., the text-entry box 258A, the search button 258B, the drop down list 258C) of the GUI 236 to prepare the NLQ 238 and submit it to the analytics server 220 for processing. In response to receiving the NLQ 238 from the client device 20, the analytics server 220 provides (block 272) the NLQ 238 to the NLP 222 for analysis. The NLP 222 receives and processes the NLQ 238 based on the one or more models 240 to identify which query details are present in the NLQ 238. As used herein, "query details" refer to the features or details of the NLQ, including references to tables of the database server 104 or the CMDB 224, aggregation operations (e.g., count, sum, mean, etc.), grouping operations (e.g., group by particular fields ascending or descending), and conditions (e.g., fields, operators, and values) indicated or implied by the NLQ. For example, in certain embodiments, the models 240 may include a model that is generated or trained, at least in part, based on the names of tables and fields stored by the DB server 104, as well as the types of data stored within these fields and the grouping and aggregation operations that are suitable for these data types. The models 240 may be additionally generated or trained to recognize alternative terminology in the NLQ 238 to enable the user to have greater freedom in preparing the NLQ 238. The models 240 may be trained to provide substitutes for certain references or terminology within the NLQ. For example, references to "I" or "me" in the NLQ may be substituted for or translated into a condition in which a user identifier field has a particular value associated with the submitter of the NLQ. By way of further example, references to "open" items (e.g., open incidents) may be substituted for or translated into a condition in which an active field has a value of true.

The process 250 illustrated in FIG. 5 continues with the analytics server 220 receiving (block 274) the query details extracted from the NLQ 238 from the NLP 222. The analytics server 220 then generates (block 276) a database query based on the query details received from the NLP 222. In certain situations, the analytics server 220 may determine that the extracted query details refer to an existing KPI for which trend data is collected and stored in the KPIs table 228. In such situations, the analytics server 220 may respond by generating a database query, based on the extracted query details, to retrieve the stored, historical values of the KPI from the KPIs table 228 for presentation to the user. In other situations, the analytics server 220 may determine that the extracted query details do not reference an existing KPI for which trend data has been collected, or that the query details do not reasonably correspond to historical KPI data (e.g., the NLQ 238 references "current incidents"). In such situations, the analytics server 220 may create a new KPI based on the extracted query details.

For example, the NLQ 238 received in block 270 may be, "How many critical incidents do I have?" In block 272, the NLP 222 may determine that the present tense "do I have" portion of the NLQ 238 indicates that the user desires to receive current KPI data rather than historical trend data. The NLP 222 may also determine that the "how many" portion of the NLQ 238 corresponds to a count operation, and that the NLQ 238 references an incident table of the CMDB tables 226 stored by the DB server 104. Additionally, the NLP 222 may determine that "critical" within the NLQ 238 refers to a particular value of a priority field in the incident table, and the "do I have" portion of the NLQ 238 refers to a value of an assigned user field in the incident table. As such, in block 276, the analytics server 220 may generate a database query in a suitable query language (e.g., structured query language (SQL)), such as, "SELECT COUNT(Incident.ID) FROM Incident WHERE Incident.Priority='CRITICAL' AND Incidents.User='John Smith'". In certain embodiments, the analytics server 220 may store the database query as part of a new KPI in the KPIs table 228 and associate this new KPI with the user or role that provided the NLQ 238. In certain embodiments, the analytics server 220 may additionally store the NLQ 238, along with the database query, in the KPIs table 228 as well.

The process 250 illustrated in FIG. 5 continues with the analytics server 220 providing (block 278) the database query to the DB server 104. In response, the analytics server 220 receives (block 280) KPI data based on the database query, and provides (block 282) an updated GUI 236 to the client device that includes a visual representation of the retrieved KPI data. In certain embodiments, the analytics server 220 may determine that the user or their associated role does not have access to the requested KPI data, and may respond by providing a suitable error message to the client device 20. As indicated by the arrow 284, the analytics server 220 can subsequently receive another NLQ 238, for example, to further "drill down" into a visually presented KPI by filtering undesired KPI data from the query, grouping the data differently, or may provide a completely different NLQ for other KPI data.

Figure 8:
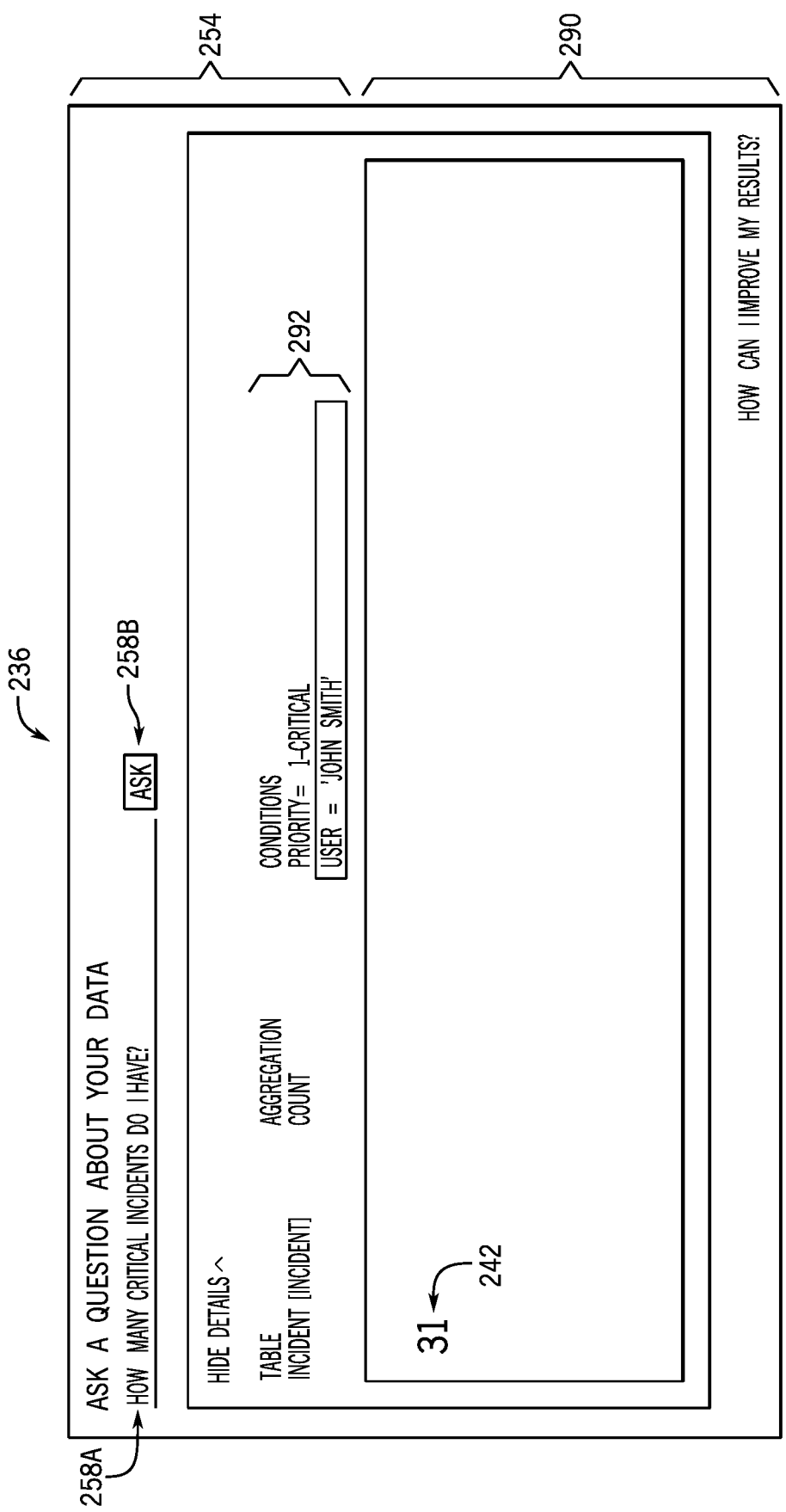
Figure 9:
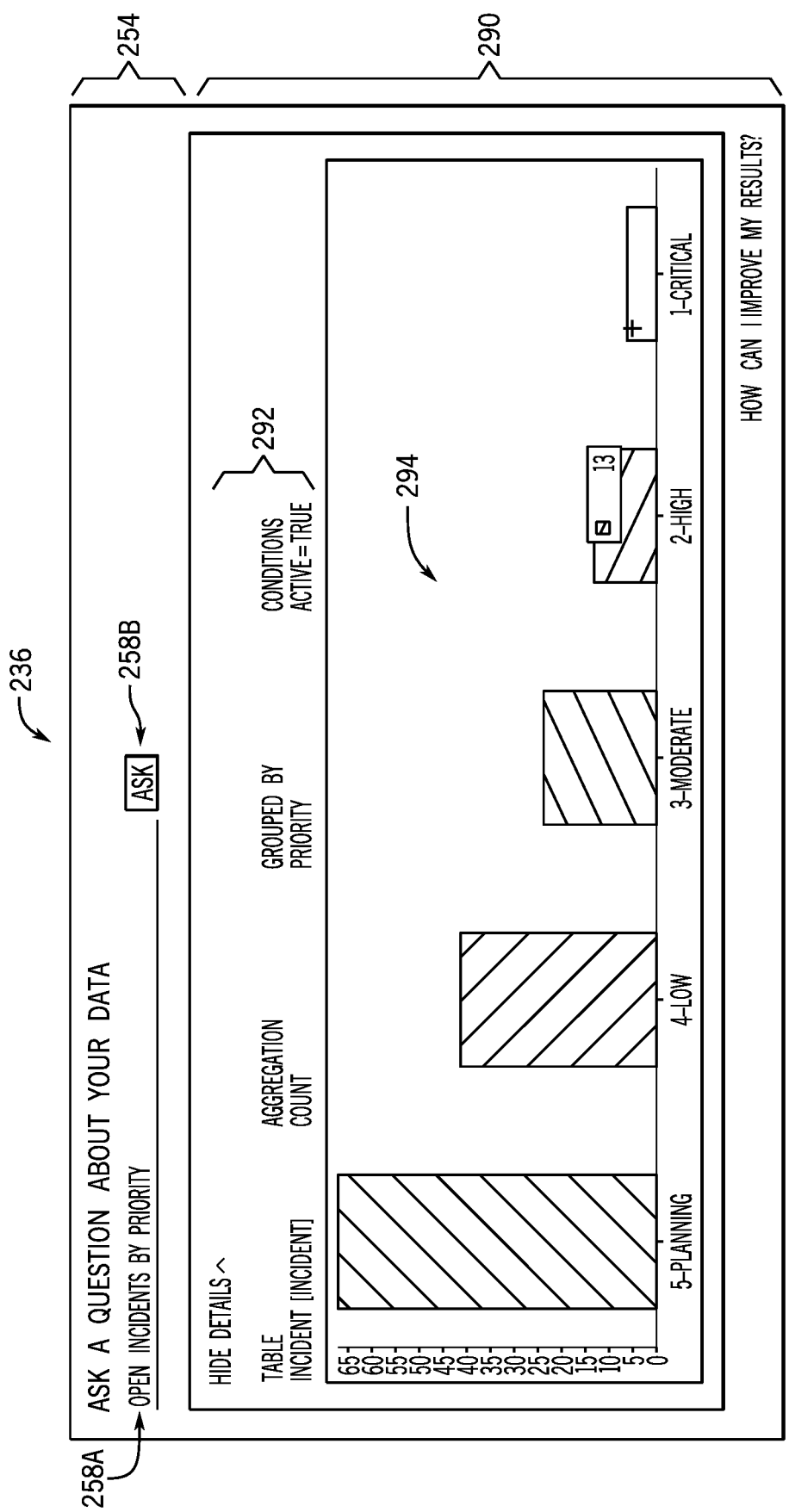
Figure 10:
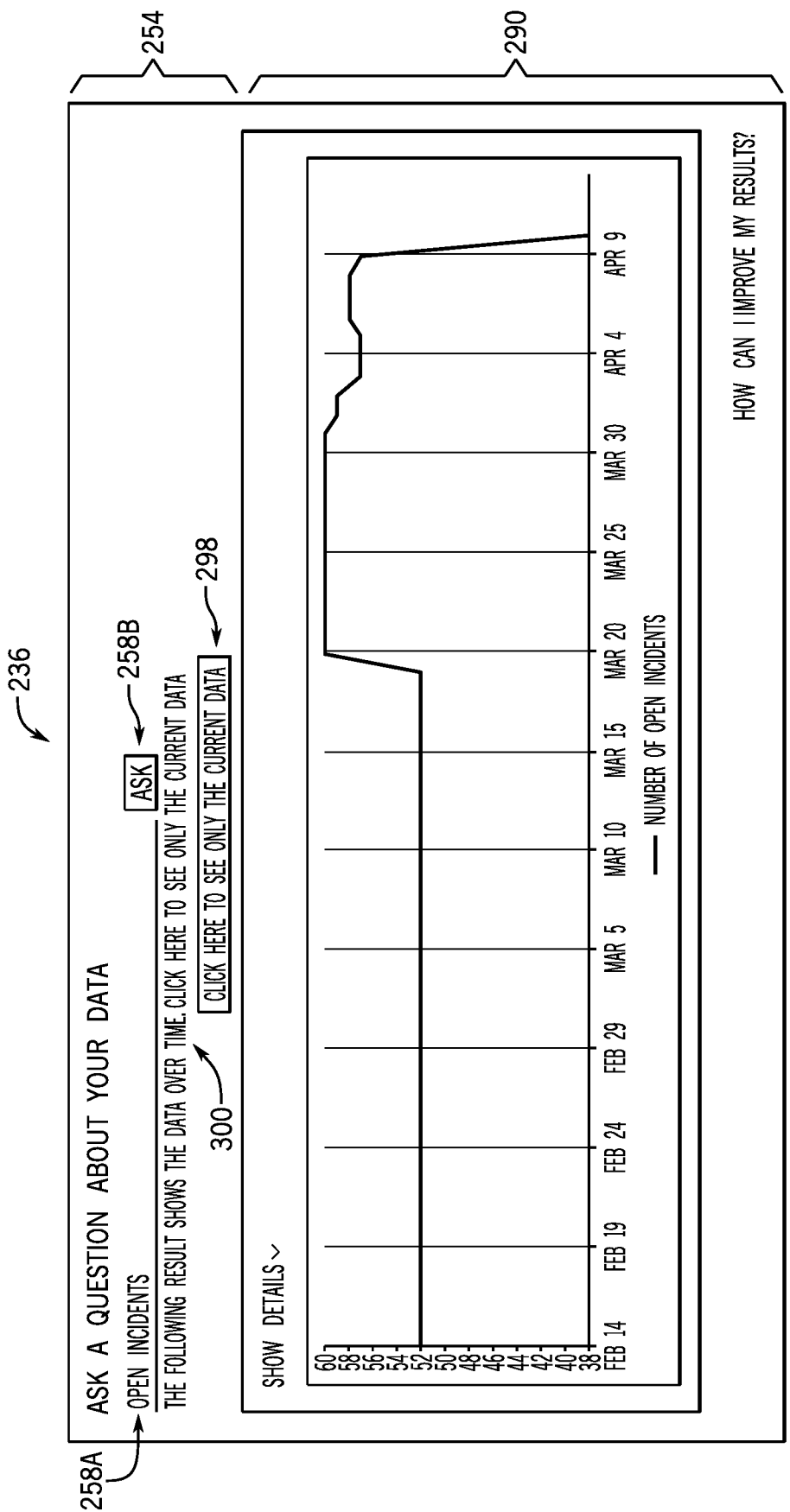

FIGS. 8, 9, and 10 illustrate example embodiments of the updated GUI 236 that is presented to the user in response to the user providing an example NLQ 238. The updated GUI 236 includes the NLQ 238 portion, which enables the user to provide additional NLQs, as mentioned above. The updated GUI 236 includes a result section 290, disposed below and adjacent to the NLQ section 254, which visually presents the retrieved KPI data 242 to the user. Additionally, the result section 290 includes a collapsible or "hide-able" details section 292 that presents query details regarding the database query that was generated from the NLQ 238, as discussed above.

FIG. 8 illustrates an example of the updated GUI 236 that is presented to the user in response to the user providing the example NLQ 238 discussed above, "How many critical incidents do I have?" The details section 292 indicates that the NLP 222 properly identified and extracted references to the incident table, to the counting aggregation operation, and to the conditions specified. As such, since this example NLQ 238 resulted in the calculation of a single aggregate value (e.g., a count of qualifying incidents), the details section 292 visually presents the retrieved KPI data 242 as a single value, indicating that there are presently 31 critical incidents associated with user, John Smith, who submitted the NLQ 238 to the analytics server 220 in this example.

FIG. 9 illustrates an example of the updated GUI 236 that is presented to the user in response to the user providing an example NLQ 238, "open incidents by priority". Based on the analysis by the NLP 222, the analytics server 220 generates a corresponding database query, "SELECT COUNT (Incident.ID) FROM Incident WHERE Incident.Active=True GROUP BY PRIORITY", which is executed by the DB server 104 to retrieve the desired KPI data. As such, the details section 292 of the GUI 236 indicates that the NLP 222 properly identified and extracted query details in terms of references to the incident table, to the counting aggregation operation, to the grouping by priority, and to the condition being "Active=true". Additionally, since the NLQ 238 was determined to include a suitable grouping, the results section 290 visually presents the retrieved KPI data as a graph, such as the illustrated bar graph 294 or a pie chart.

FIG. 10 illustrates an example of the updated GUI 236 that is presented to the user in response to the user providing an example NLQ 238, "open incidents". Based on the analysis by the NLP 222, the analytics server 220 determines that NLQ 238 corresponds to an existing open incidents KPI for which historical trend data has been collected in the KPIs table 228. For this example, the analytics server 220 is designed to periodically execute a database query of the open incidents KPI, and to store the results of each execution within the KPIs table 228 for later trend analysis. For example, the database query associated with the open incidents KPI may be "SELECT COUNT (Incident.ID) FROM Incident WHERE Incident.Active=True", which calculates a real-time value for each periodic execution based on the number of open incidents present in the CMDB 224 at the time the query is executed, and each of these real-time values may be collected and stored within the KPIs table 228. As such, in certain embodiments, when the analytics server 220 determines that the KPI referenced by the NLQ 238 has associated trend data, the analytics server 220 may default to executing a suitable database query to retrieve the stored trend data for the KPI from the KPIs table 228, and then update the GUI 236 to present the trend data associated with the KPI on a suitable graph (e.g., a trend line 296), as illustrated in FIG. 10. In particular, the GUI 236 includes a notification 298 indicating that the visually depicted data is trend data rather than current data for the KPI.

However, it is appreciated that, in certain circumstances, the user may have provided the "open incidents" NLQ 238 with the desire to view underlying data regarding current open incidents, rather than the trend data associated with the open incidents KPI presented in the results section of FIG. 10. As such, the GUI 236 illustrated in FIG. 10 includes a link 300 that enables the user to request that the analytics server 220 instead present only the current data for the KPI indicated in the NLQ 238. In response to receiving the user selection of this link 300, the analytics server 220 may instead generate a database query, based on the query details of the NLQ 238, that retrieves only the current CMDB data associated with the indicated KPI. For example, based on the output of the NLP 222, the analytics server 220 may generate the database query, "SELECT*FROM Incident WHERE Incident. Active=True". Subsequently, the analytics server 220 may present the GUI 236 illustrated in FIG. 11, which includes a table 302 that presents the results of the query to the user.

The technical effects of the present disclosure include an analytics server that enables NLQs to be used to access and analyze KPI data. The analytics server includes a GUI that presents a set of KPIs that are associated with a user, and includes suitable user interface elements to enable the user to provide NLQs regarding these KPIs. Based on the query details extracted from the NLQ by the NLP, the analytics server generates a suitable database query to retrieve the KPI data requested by the NLQ. The GUI is then updated to present a visual representation (e.g., a bar graph, a pie chart, a trend line, a single value) of the retrieved KPI data. Furthermore, the NLQ user interface elements enable the user to continue to adjust the NLQ or to provide new NLQs to further adjust the scope of the KPI data retrieved and presented. This enables the user to effectively and efficiently "drill down" into particular KPI data using NLQs, without requiring the user to be familiar with complex database query languages.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   at least one memory configured to store a database server that includes a configuration management database (CMDB), a key performance indicator (KPI) table, and an access control list (ACL) table, wherein the CMDB stores operational metrics of a plurality of configuration items (CIs) associated with a communicatively coupled client network, and wherein the KPI table stores KPIs that track the operational metrics stored in the CMDB; and
   at least one processor configured to execute stored instructions to perform actions comprising:
      providing, to a client device, a graphical user interface (GUI) that is presented to a user of the client device;
      receiving, from the client device, a natural language query (NLQ);
      processing the NLQ using a natural language processor (NLP) to extract query details from the NLQ, wherein the query details comprise one or more tables of the CMDB;
      generating a database query based on the query details extracted from the NLQ;
      in response to determining, within the ACL table, that the user is authorized to access the one or more tables of the CMDB, processing the database query against the one or more tables of the CMDB to determine KPI data from the stored operational metrics;
      storing the NLQ, the database query, and the KPI data within the KPI table as a particular KPI; and providing the KPI data of the particular KPI to the client device in response to the NLQ, wherein the GUI is updated to present a visual representation of the KPI data of the particular KPI on the client device.

2. The system of claim 1, wherein the at least one processor is configured to execute the stored instructions to perform actions comprising:
   determining, within the ACL table, a role of a user of the client device;
   determining, within the KPI table, other KPI data for a plurality of KPIs that are associated with the role of the user; and
   providing the other KPI data to the client device, wherein the GUI includes a table that is configured to present the other KPI data of the plurality of KPIs associated with the role of the user.

3. The system of claim 2, wherein each row of the table is configured to present a respective KPI of the plurality of KPIs associated with the role of the user, and wherein each respective KPI is presented with a name of the respective KPI, a visual depiction of a trendline of the respective KPI over a predefined time window, a current data point value of the respective KPI, a change between the current data point value and a previous data point value of the respective KPI, and a target value of the respective KPI.

4. The system of claim 1, wherein the GUI comprises a drop down list that includes selectable NLQs, and wherein the at least one processor is configured to execute the stored instructions to perform actions comprising:
   determining, within the KPI table, one or more NLQs previously received from the client device; and
   populating the drop down list of the GUI with the one or more NLQs.

5. The system of claim 1, wherein the GUI comprises a drop down list that includes selectable NLQs, and wherein the at least one processor is configured to execute the stored instructions to perform actions comprising:
   determining, within the ACL table, a role of a user of the client device;
   determining, within the KPI table, other KPI data for a plurality of KPIs that are associated with the role of the user; and
   populating the drop down list of the GUI with names or descriptions of the plurality of KPIs.

6. The system of claim 1, wherein the GUI is updated to present the visual representation of the KPI data of the particular KPI as a single aggregate value or as a bar graph.

7. The system of claim 1, wherein the GUI is updated to present the visual representation of the KPI data of the particular KPI as a trend line that includes real-time data.

8. The system of claim 1, wherein the GUI is updated to include a details section that indicates the query details extracted from the NLQ, wherein the details section includes a table subsection that indicates the one or more tables of the CMDB of the database query, an aggregation subsection that indicates an aggregation operation of the database query, a grouping subsection that indicates a grouping operation of the database query, and a condition subsection that indicates one or more conditions of the database query.

9. The system of claim 1, wherein the query details comprise an aggregation operation, a grouping operation, and one or more conditions.

10. The system of claim 1, wherein the operational metrics stored by the CMDB comprise alerts, incident tickets, problem tickets, and change tickets related to operation of the plurality of CIs associated with the communicatively coupled client network.

11. The system of claim 1, wherein the at least one processor is configured to execute the stored instructions to perform actions comprising:
   periodically re-processing the database query against the one or more tables of the CMDB to determine updated KPI data for the particular KPI from the stored operational metrics; and
   storing the updated KPI data within the KPI table for the particular KPI.

12. A method, comprising:
   providing a database server that includes a configuration management database (CMDB), a key performance indicator (KPI) table, and an access control list (ACL) table, wherein the CMDB stores operational metrics of a plurality of configuration items (CIs) associated with a communicatively coupled client network, and wherein the KPI table stores KPIs that track the operational metrics stored in the CMDB;
   providing, to a client device, a graphical user interface (GUI) that is presented to a user of the client device, wherein the GUI includes user interface elements configured to receive a natural language query (NLQ) from the client device;
   receiving the NLQ from the client device;
   processing the NLQ using a natural language processor (NLP) to extract query details, wherein the query details comprise one or more tables of the CMDB;
   generating a database query based on the query details extracted from the NLQ;
   in response to determining, within the ACL table, that the user is authorized to access the one or more tables of the CMDB, processing the database query against the one or more tables of the CMDB to determine KPI data from the stored operational metrics;
   storing the NLQ, the database query, and the KPI data within the KPI table as a particular KPI; and
   providing the KPI data of the particular KPI to the client device in response to the NLQ, wherein the GUI is updated to present a visual representation of the KPI data of the particular KPI on the client device.

13. The method of claim 12, wherein the user interface elements comprise a drop down list that includes selectable options for the NLQ, wherein the drop down list is populated with one or more NLQs stored in the KPI table that were previously received from the user of the client device and names or descriptions of a plurality of KPIs of the KPI table that are associated with a role of the user indicated in the ACL table.

14. The method of claim 13, wherein the GUI includes a table that is configured to present KPI data for the plurality of KPIs associated with the role of the user, wherein each row of the table is configured to present a respective KPI of the plurality of KPIs associated with the role of the user, and wherein each respective KPI is presented with a name of the respective KPI, a visual depiction of a trendline of the respective KPI over a predefined time window, a current data point value of the respective KPI, a change between the current data point value and a previous data point value of the respective KPI, and a target value of the respective KPI.

15. The method of claim 12, wherein the visual representation is a single aggregate value, a pie chart, a bar graph, or a trend line.

16. The method of claim 12, wherein the query details comprise an aggregation operation or a grouping operation.

17. The method of claim 12, comprising:
storing the NLQ with a collection of previously received NLQs in the KPI table, wherein the user interface elements are configured to present selectable options for the NLQ from the collection of previously received NLQs.

18. A non-transitory, computer-readable medium storing instructions executable by a processor of an analytics server that is communicatively coupled to a database server, wherein the database server includes a configuration management database (CMDB), a key performance indicator (KPI) table, and an access control list (ACL) table, wherein the CMDB stores operational metrics of a plurality of configuration items (CIs) associated with a communicatively coupled client network, and wherein the KPI table stores KPIs that track the operational metrics stored in the CMDB, the instructions comprising instructions to:
determine, within the ACL table, a role of a user of a client device;
determine a plurality of KPIs associated with the role of the user;
provide, to the client device, a graphical user interface (GUI) that includes user interface elements configured to receive a natural language query (NLQ) from the user of the client device, wherein the user interface elements include a list of selectable NLQs populated using names or descriptions of the plurality of KPIs associated with role of the user;
receive the NLQ from the client device and process the NLQ to extract query details, wherein the query details comprise one or more tables of the CMDB;
in response to determining, within the ACL table, that the user is authorized to access the one or more tables of the CMDB, perform a database query of the one or more tables of the CMDB based on the query details to determine KPI data from the stored operational metrics;
store the NLQ, the database query, and the KPI data within the KPI table as a particular KPI; and
provide the KPI data of the particular KPI to the client device in response to the NLQ, wherein the GUI is updated to present a visual representation of the KPI data of the particular KPI on the client device.

19. The medium of claim 18, wherein the instructions comprise instructions to:
determine, within the KPI table, a plurality of NLQs previously received from the user of the client device, wherein the list of selectable NLQs is also populated using the plurality of NLQs previously received from the user of the client device.

20. The medium of claim 18, wherein the GUI includes a table that is configured to present the plurality of KPIs associated with the role of the user in the CMDB, wherein the table includes a trend line column that presents a current trend line of each of the plurality of KPIs.

* * * * *